United States Patent
Kepler et al.

(10) Patent No.: US 8,826,583 B2
(45) Date of Patent: Sep. 9, 2014

(54) SYSTEM FOR AUTOMATICALLY ALIGNING A RIFLE SCOPE TO A RIFLE

(75) Inventors: Matthew Flint Kepler, Austin, TX (US); Douglas Richard Hammond, Austin, TX (US)

(73) Assignee: TrackingPoint, Inc., Pflugerville, TX (US)

( * ) Notice: Subject to any disclaimer, the term of this patent is extended or adjusted under 35 U.S.C. 154(b) by 0 days.

(21) Appl. No.: 13/535,014

(22) Filed: Jun. 27, 2012

(65) Prior Publication Data

US 2014/0002812 A1    Jan. 2, 2014

(51) Int. Cl.
*F41G 1/38*    (2006.01)

(52) U.S. Cl.
USPC ............................................. 42/119

(58) Field of Classification Search
USPC ........... 42/111, 113–117, 119–125, 131, 134, 42/135; 89/204; 33/286, 263; 356/153
See application file for complete search history.

(56) References Cited

U.S. PATENT DOCUMENTS

| | | | |
|---|---|---|---|
| 3,614,238 A * | 10/1971 | Stites | 356/124 |
| 3,684,383 A * | 8/1972 | Johansson | 356/154 |
| 3,787,693 A * | 1/1974 | Stone | 250/330 |
| 4,142,799 A * | 3/1979 | Barton | 356/153 |
| 4,665,795 A * | 5/1987 | Carbonneau et al. | 89/41.03 |
| 4,676,636 A * | 6/1987 | Bridges et al. | 356/153 |
| 5,374,986 A * | 12/1994 | Solinsky | 356/4.01 |
| 5,499,455 A | 3/1996 | Palmer | |
| 5,629,767 A | 5/1997 | Tchejeyan | |
| 5,960,576 A | 10/1999 | Robinson | |
| 6,031,604 A | 2/2000 | Pniel | |
| 6,196,455 B1 | 3/2001 | Robinson | |
| 6,252,706 B1 * | 6/2001 | Kaladgew | 359/399 |
| 6,369,942 B1 | 4/2002 | Hedrick et al. | |
| 6,406,298 B1 | 6/2002 | Varshneya et al. | |
| 6,793,494 B2 | 9/2004 | Varshneya et al. | |
| 7,222,432 B2 | 5/2007 | Pai et al. | |
| 7,292,262 B2 | 11/2007 | Towery et al. | |
| 7,603,804 B2 | 10/2009 | Zaderey et al. | |
| 7,784,192 B2 * | 8/2010 | Jancic et al. | 33/286 |
| 7,946,075 B2 | 5/2011 | Nasef | |
| 2002/0134000 A1 | 9/2002 | Varshneya et al. | |
| 2005/0213962 A1 * | 9/2005 | Gordon | 396/502 |
| 2010/0251593 A1 * | 10/2010 | Backlund et al. | 42/120 |
| 2012/0171643 A1 * | 7/2012 | Reardon et al. | 434/11 |
| 2012/0198748 A1 * | 8/2012 | Ospino Orozco | 42/115 |

OTHER PUBLICATIONS

Professional Reticle Leveling System, Wheeler Engineering Fine Gunsmithing Supplies, Instruction #1014063, Revision A, pp. 1-2.

(Continued)

*Primary Examiner* — Reginald Tillman, Jr.
(74) *Attorney, Agent, or Firm* — Cesari & Reed LLP; R. Michael Reed

(57) ABSTRACT

A rifle scope includes at least one optical sensor configured to capture optical data corresponding to at least one of a barrel of a firearm and an appendage coupled to the barrel. The rifle scope further includes a controller coupled to the at least one optical sensor and configured to determine an angular position of the barrel in response to capturing the optical data. The controller is configured to automatically determine an alignment of the rifle scope relative to the barrel in response to determining the angular position.

22 Claims, 7 Drawing Sheets

(56) References Cited

OTHER PUBLICATIONS

Professional Reticle Leveling System, Wheeler Engineering, Overview, http://www.battenfeldtechnologies.com/wheeler-engineering/catalog.asp?product=professional-leveling-reticle-system, p. 1—printed Jun. 25, 2012.

Wheeler Engineering, Level Level Level "The Simplest, Most Accurate Scope Leveling System Ever Devised," printed Jun. 25, 2012, http://www.battenfeldtechnologies.com/wheeler-engineering/catalog.asp?product=Level-Level-Level, p. 1.

Wheeler Engineering, Level Level Level Instructions, http://www.battenfeldtechnologies.com/downloads/instructions/113088-Level-Level-Level-instructions.pdf, p. 1, downloaded Jun. 25, 2012.

* cited by examiner

SYSTEM FOR AUTOMATICALLY ALIGNING A RIFLE SCOPE TO A RIFLE

FIELD

The present disclosure is generally related to rifle scopes, and more particularly to a rifle scope configured to automatically align to a rifle.

BACKGROUND

Conventionally, shooters and hunters may mount some type of optical scope on their rifles to aid in target engagement. The optical scope allows the shooter to see targets at longer ranges, and provides a reticle or cross-hair that shows the shooter where to aim the gun. When mounting the optical scope to the gun, shooters must align their scope such that the reticle is aligned with the gun's barrel so that their aim point aligns with where the barrel is pointing. The process of aligning the optical scope to the gun is sometimes referred to as a calibration process. The calibration process is usually difficult and tedious and often involves manual adjustments, which are subject to human error. In particular, the user may need to fire the rifle multiple times, making small adjustments after each shot, to accurately calibrate the rifle scope to the rifle.

When mounting the scope, a user uses a manual boresight method to grossly align the scope reticle with the barrel bore by looking down the barrel bore at a target then adjusting the reticle position to align with the same target. Typically, the user manually adjusts the reticle position by turning knobs or turrets to move the reticle left or right and up or down. After the user has aligned his scope and barrel as closely as possible by bore-sighting, the user then will shoot rounds at a target to verify the alignment and to make further left/right and/or up/down adjustments. This method of aligning the optical scope to the rifle is time consuming and potentially inaccurate.

The alignment between the scope and gun may move and change based on many factors including the shock generated by the firing of the gun, changes in the barrel orientation due to shock and heat, changes in temperature and other environmental conditions, and jostling and vibration during shipping and transport. The alignment may also move or change in response to mechanical movement, internal heating and cooling, remounting, and accidents, such as dropping the firearm with the scope attached. As a result, from shot-to-shot, the scope may lose some degree of alignment with the barrel resulting in inaccurate shots.

SUMMARY

In an embodiment, a rifle scope includes at least one optical sensor configured to capture optical data corresponding to at least one of a barrel of a firearm and an appendage coupled to the barrel. The rifle scope further includes a controller coupled to at least one optical sensor and configured to determine an angular position of the barrel in response to capturing the optical data. The controller is configured to automatically determine an alignment of the rifle scope relative to the barrel in response to determining the angular position.

In another embodiment, a method includes automatically capturing optical data corresponding to at least one of a barrel of a firearm and an appendage coupled to the barrel using a rifle scope coupled to the firearm. The method further includes automatically determining an angular position of the barrel relative to the rifle scope in response to capturing the optical data and automatically determining an alignment of the rifle scope relative to the barrel in response to determining the angular position.

In still another embodiment, a viewing device includes at least one optical sensor configured to capture optical data associated with a barrel of a firearm and a controller coupled to at least one optical sensor. The controller is configured to determine an angular position of the barrel relative to the viewing device in response to capturing the optical data to automatically align the viewing device to the barrel.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of a telescopic device that can be implemented as a rifle scope are described below. The telescopic device includes circuitry configured to automatically determine an alignment of the telescopic device relative to a barrel of a firearm or relative to an appendage or component coupled to the barrel. In one example, the telescopic device determines the alignment using a laser beam directed toward the barrel or the appendage. In this example, the telescopic device receives a reflected version of the laser beam from the barrel or the appendage and compares a position of the reflected version to a previously recorded reference position to determine the relative orientation of the telescopic device to the barrel. The telescopic device also compares a reference beam (internal to the telescopic device) to a previously recorded internal reference to detect internal variations based on an offset between the reference beam and the internal reference. In another example, the circuitry receives a collimated beam from a light-emitting circuit coupled to the barrel and determines the alignment in response to receiving the collimated beam. In still another embodiment, the circuitry determines the alignment based on light emitted by a florescent element or coating, which may or may not be energized by directing the laser beam at the florescent element or coating. In yet another embodiment, the circuitry determines the alignment in response to receiving light emitted from a passive emitter or radioactive element coupled to the barrel. In still another embodiment, the circuitry includes a camera configured to capture images associated with the barrel of a firearm and to apply image processing to the captured images to determine the alignment of the telescopic device relative to the barrel. Once the alignment is determined, the alignment may be used to adjust the view area of the rifle scope, to adjust the position of the reticle, or for other purposes. In a particular example, the determined alignment information may be used in conjunction with other information to determine a ballistic solution. An example of a telescopic device configured to automatically determine the alignment relative to a barrel of a firearm is described below with respect to FIG. 1.

Figure 1:
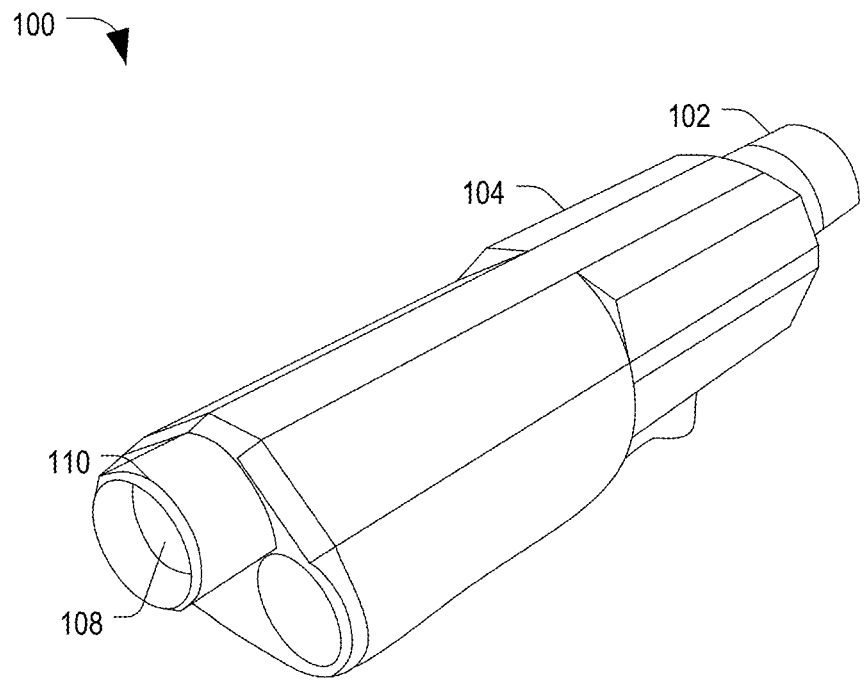
FIG. 1 is a perspective view of an embodiment of a rifle scope that is configured for automatic alignment.

FIG. 1 is a perspective view of an embodiment of a rifle scope 100 that is configured for automatic alignment. Rifle scope 100 includes an eyepiece 102 through which a user may look to see a view area. Rifle scope 100 further includes a housing 104 that defines an enclosure to secure circuitry and sensors configured to determine an angular position of a barrel of a firearm relative to the rifle scope 100 and to automatically determine an alignment of the rifle scope 100 to the firearm based on the angular position. Rifle scope 100 further includes a lens portion 110 having an objective lens 108 for focusing light toward one or more optical sensors within the housing. Rifle scope 100 may determine the alignment based on optical data associated with the barrel or an appendage coupled to the barrel. The appendage may be a passive component (such as the iron sight, a reflective element, a florescent or radioactive coating or element, a geometric shape, or some other feature coupled to the barrel) or an active component (such as a light-emitting diode circuit), or any combination thereof. In one instance, the appendage includes a radioactive source, such as Tritium, configured to emit detectable amounts of radiation in the form of electrons or light. In another instance, the appendage further includes fiber optic conduits configured to deliver the light to optical sensors within rifle scope 100.

Figure 2:
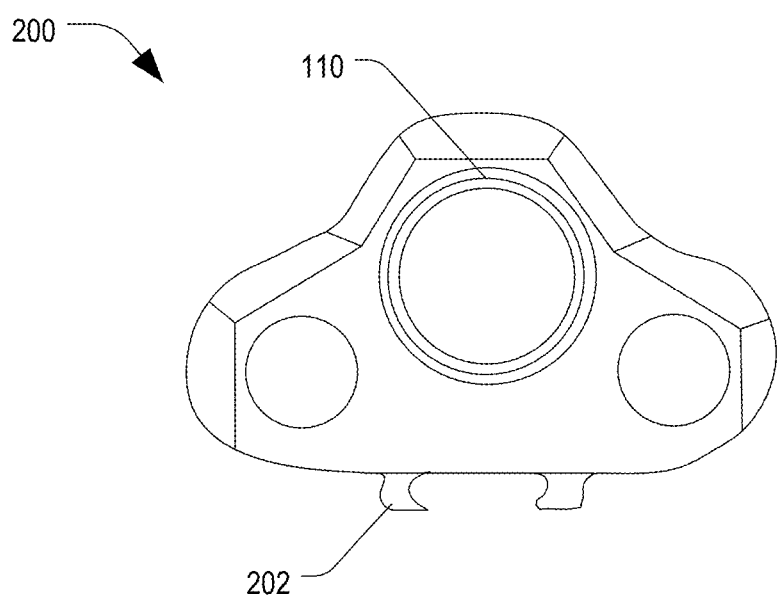
FIG. 2 is a front view of an end of the rifle scope of FIG. 1 that includes optical sensors.

FIG. 2 is a front view 200 of an end of the rifle scope 100 of FIG. 1 that includes optical sensors. Rifle scope 100 includes mounting rails 202, which may be used to couple and release to corresponding mounting structures on a firearm. Circuitry within rifle scope 100 automatically determines an alignment of the rifle scope 100 relative to the barrel. This automatic alignment allows the user to mount the rifle scope to the firearm and to begin to use the resulting firearm system without further calibration. An example of a firearm system including rifle scope 100 is described below with respect to FIG. 3.

Figure 3:
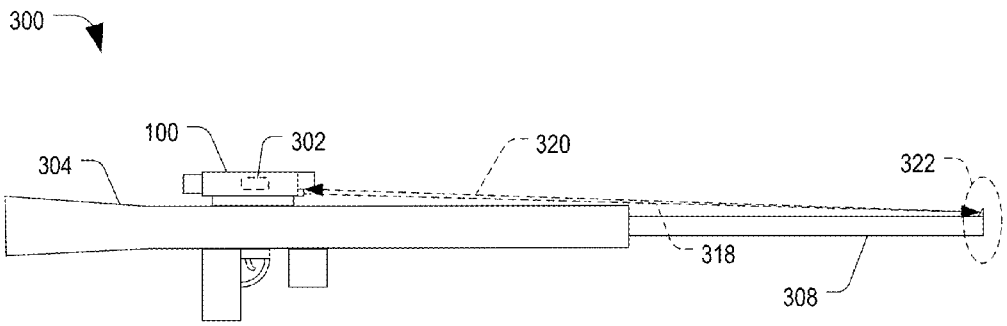
FIG. 3 is a diagram of an embodiment of a firearm system including the rifle scope of FIG. 1.

FIG. 3 is a diagram of an embodiment of a firearm system 300 including the rifle scope 100 of FIG. 1. Rifle scope 100 is coupled to a firearm 304 and includes circuitry 302 configured to determine the alignment of rifle scope 100 relative to a barrel 308 of firearm 304. In this embodiment, circuitry 302 controls a laser source to direct a laser beam 318 toward barrel 308 or an appendage coupled to the barrel 308 (generally indicated at 322). In response to directing the laser beam 318 toward barrel 308 or appendage 322, circuitry 302 receives a reflected version 320 of laser beam 318 and compares the reflected version to a reference beam to determine an angular position of the barrel 308 relative to rifle scope 100. An example of an embodiment of the circuit 302 is described below with respect to FIG. 4.

Figure 4:
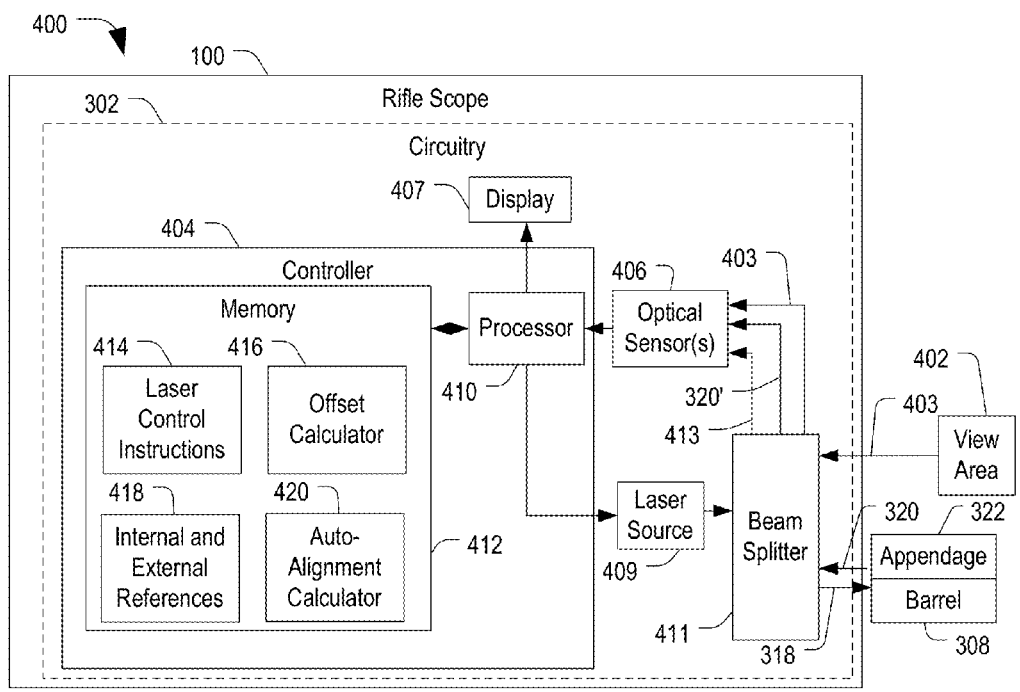
FIG. 4 is a block diagram of a first embodiment of a system including a rifle scope configured for automatic alignment to a barrel or appendage of a firearm.

FIG. 4 is a block diagram of an embodiment of a system 400 including a rifle scope 100 configured for automatic alignment to barrel 308 or appendage 322 of a firearm 304. Rifle scope 100 includes circuitry 302. Circuitry 302 includes a controller 404, one or more optical sensors 406 configured to capture optical data of the view area 402 and/or to capture optical data associated with the barrel and/or appendage 322, a display 407, a laser source 409, and a beam splitter 411.

Controller 404 includes a processor 410 coupled to one or more optical sensors 406, display 407, and laser source 409. Further, controller 404 includes a memory 412 coupled to the processor 410. Memory 412 stores instructions that, when executed, cause processor 410 to perform various functions. Memory 412 includes laser control instructions 414 that, when executed, cause processor 410 to control laser source 409 to direct a beam toward beam splitter 411. Beam splitter 411 reflects a portion of the incident energy, absorbs a relatively small portion, and transmits the remaining energy. In this instance, beam splitter 411 splits the beam into a first beam 318 directed toward one of barrel 308 and appendage 322 and a second (reference) beam 413 directed toward one or more optical sensors 406. The first beam 318 may be reflected by a portion of barrel 308 or appendage 322 to produce a reflected beam 320, which is received by beam splitter 411 and redirected to optical sensors 406.

Memory 412 further includes an offset calculator 416 that, when executed, causes processor 410 to determine an internal offset between the reference beam and an internal reference and an external offset between reflected version 320 of beam 318 and an external reference. The internal and external offsets can be used to determine an angular position of barrel 308 relative to rifle scope 100. Memory 412 may store internal and external reference points 418. In an example, during manufacturing, the manufacturer may align the sensor and bore and then record the location of an internal reference dot and the location of the external reference dot in memory 412. Memory 412 also includes an automatic-alignment calculator 420 that, when executed, causes processor 410 to automatically align rifle scope 100 to the barrel 308.

In the illustrated example, the beam splitter 411 divides the laser beam into a first beam 318 and a reference beam 413, and directs the reference beam 413, the reflected version 320' of the laser beam, and visual information from view area 402 toward optical sensors 406. An example of one possible beam splitter configuration is described below with respect to FIG. 5.

Figure 5:
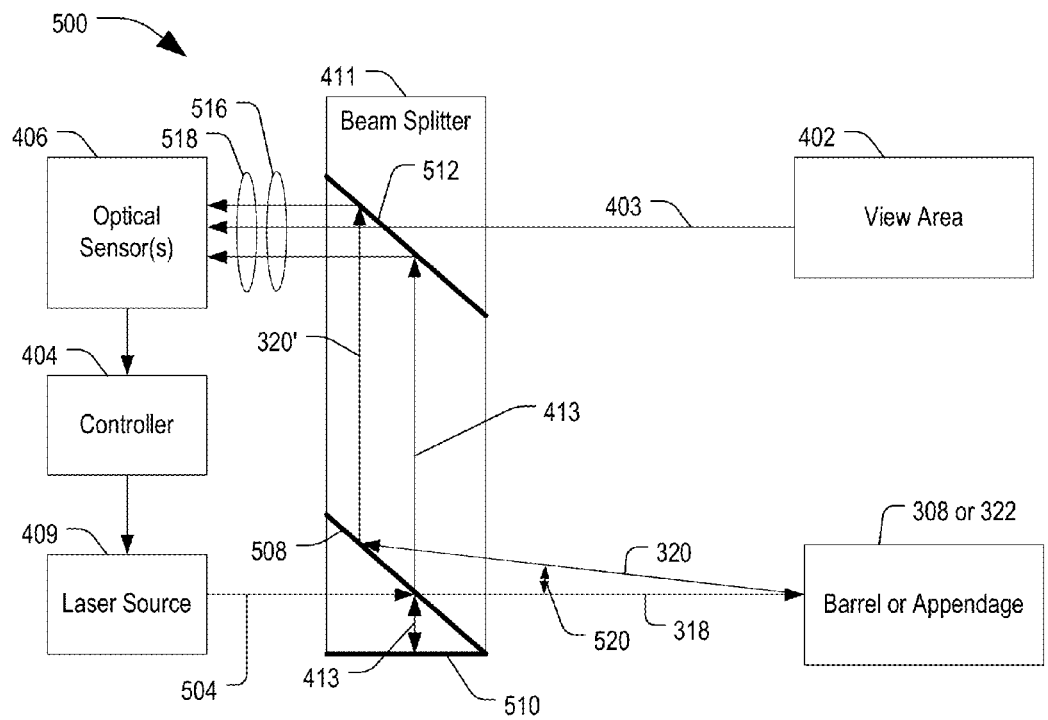
FIG. 5 is a block diagram of an embodiment of a portion of circuitry of the rifle scope including a beam splitter.

FIG. 5 is a block diagram of an embodiment of a portion 500 of circuitry 302 of rifle scope 100 including beam splitter 411. Portion 500 includes controller 404, optical sensors 406, laser source 409, and beam splitter 411. Controller 404 controls laser source 409 to transmit a beam 504 toward beam splitter 411.

Beam splitter 411 includes a first mirror 508, a second mirror 510, and a third mirror 512. First mirror 508 is configured to split laser beam 504 into first beam 318 directed toward barrel 308 or appendage 322 and a second (reference) beam 413 directed toward a second mirror 510. Second mirror 510 reflects second (reference) beam 413 toward third mirror 512, which directs second reference beam 413 through lenses 516 and 518 to optical sensors 406. First beam 318 strikes barrel 308 or appendage 322, which reflects beam 318 to produce reflected version 320 directed toward mirror 508 of beam splitter 411. Mirror 508 directs reflected version 320' toward mirror 512, which redirects reflected version 320' through lenses 516 and 518 toward optical sensors 406. Optical sensors 406 receive reference beam 413 and reflected version 320', compares the locations of reference beam 413 and reflected version 320' to internal and external reference locations 418 from memory 412. Controller 404 determines an internal offset between the location of reference beam 413 and the location of the internal reference to correct for optical axis shifts internal to the rifle scope 100. Controller 404 further determines an external offset based on a difference between the external reference and the reflected version 320' of the beam to correct for shifts in the relationship between rifle scope 100 and the barrel 308.

As discussed above, the alignment between the rifle scope 100 and the barrel 308 of a gun may move and change based on many factors including, but not limited to, the shock generated by the firing of the gun, changes in the barrel orientation due to shock and heat, changes in temperature and other environmental conditions, jostling and vibration during shipping and transport, internal heating and cooling, remounting, and accidents, such as dropping the firearm with the scope attached. In general, beam 318 strikes barrel 308 or appendage 322 at an angle of incidence and is reflected back at an angle of reflection. The angle of incidence and angle of reflection add together to produce an offset angle (generally indicated at 520). In an example, if appendage 322 is a reflective element and is shifted by 1 minute of angle, the reflected version 320 will be reflected toward beam splitter 411 at an offset 520 that is 2 minutes of angle relative to the original beam. Thus, external misalignment or shifting produces a 2× offset with respect to reflected version 320.

In operation, lens 516 may be shifted relative to lens 518 in order to adjust magnification and/or focus. Such shifting produces the same variation with respect to both reflected version 320' and reference beam 413. Controller 404 may take into account both internal and external offsets to determine the alignment of the rifle scope 100 relative to the barrel 308. Even when mechanical shock causes lenses 516 and 518 to shift, resulting errors produce only a 1× error, which may be canceled out because both beams experience the same offset error. Alternatively, such a shift will produce an error that can be calculated and used, for example, in a ballistic solution.

Beam splitter 411 reflects a portion of the incident energy, absorbs a relatively small portion, and transmits the remaining energy. In a particular embodiment, mirror 508 is a 50% mirror, which reflects approximately 50% of the incident energy as reference beam 413 and which transmits approximately 50% of the incident energy as first beam 318. In this instance, first beam 318 and reference beam 413 each have approximately 50% of the incident energy of beam 504. In this embodiment, mirror 510 is a 100% mirror that reflects reference beam 413 without attenuation toward mirror 512. Both the reference beam 413 and reflected beam 320 lose an additional 50% of their energy when they respectively transmit through or reflect off of the splitter surface 508. This leaves beams 320' and 413 each with 25% of the energy of beam 504. Mirror 512 is a 50% mirror, which reflects approximately 50% of the incident energy of reference beam 413 and reflected version 320' toward optical sensors 406. In this embodiment, optical sensors 406 receive reference beam 413' and reflected version 320' at approximately 12.5% of the energy of beam 504. It is also possible that mirror 512 can be configured to combine the light 403 from view area 402 and the laser beams 413 and 320' spectrally, with no loss of either signal.

Controller 404 uses sensor data from optical sensors 406 and determines an internal offset between reference beam 413 and an internal reference from memory 412 and an external offset between reflected version 320' and an external reference from memory 412. The internal and external offsets may be used to determine an angular position of barrel 308 or appendage 322 relative to rifle scope 100. An example of the relative offset is described below with respect to FIG. 6.

Figure 6:
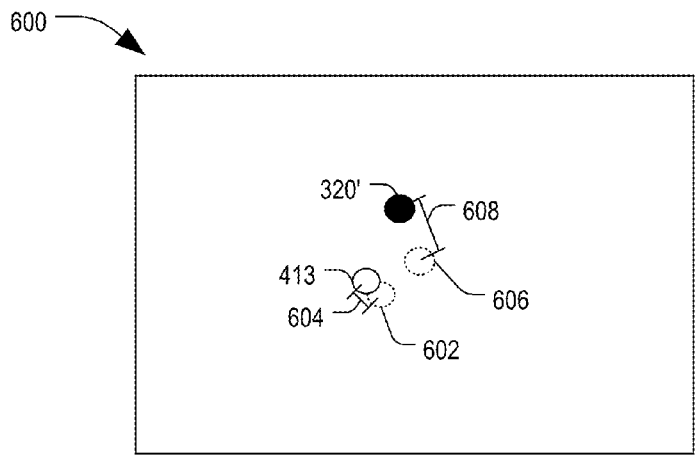
FIG. 6 is a diagram depicting a reference beam and a reflected beam detected by the offset detection portion of the rifle scope of FIG. 5.

FIG. 6 is a diagram 600 depicting an offset 604 between a location of an internal reference 602 and a location of reference beam 413. The internal reference 602 defines a vector representing an optical axis shift internal to rifle scope 100. Diagram 600 further depicts an external offset 608 between a location of an external reference 606 and the redirected version 320' of reflected beam 320. The internal reference 602 is used to measure internal shifts due to components within rifle scope 100, while external reference 606 is used to measure external "macro" shifts between rifle scope 100 and barrel 308.

In an example, during manufacturing, rifle scope 100 may be aligned to the bore of barrel 308. The locations of internal reference ($I_z$) 602 and external reference ($E_z$) 606 may be recorded in memory. The internal reference ($I_z$) 602 is an internal "zero" calibrated location, and external reference ($E_z$) 606 is an external "zero" calibrated location. Periodically, or via user triggered events, controller 404 controls laser source 409 to fire the laser beam and to capture new internal position ($I_n$) and external position ($E_n$) data points. The zero adjustment ($A_z$) can be determined according to the following equation:

$$A_z = \frac{[(E_n - E_z) - (I_n - I_z)]}{2} + (I_n - I_z) \qquad (1)$$

In Equation 1, the internal adjustment represents the difference between the internal reference ($I_z$) 602 and the new internal position ($I_n$) (beam 413). Further the zero adjustment ($A_z$) includes the difference between the new external position ($E_n$) and the internal offset ($I_n$-$I_z$), which difference is divided by two. The second half of the equation is divided by two to represent the 2× impact of external changes due to the angle of incidence plus the angle of reflection, which doubles the effect of the external shift. Thus, the internal reference corrects for optical axis shifts internal to rifle scope 100 while the external reference corrects shifts in the relationship between the rifle scope 100 and the bore of barrel 308.

While the above-embodiment uses a dual-beam approach (reference beam 413 and redirected version 320' of reflected version 320 of first beam 318) to determine the angular position relative to internal and external references 602 and 606, it is also possible to determine the angular position of barrel 308 based on a beam from a light-emitting diode (LED) circuit. One possible example of an LED circuit is described below with respect to FIG. 7.

Figure 7:
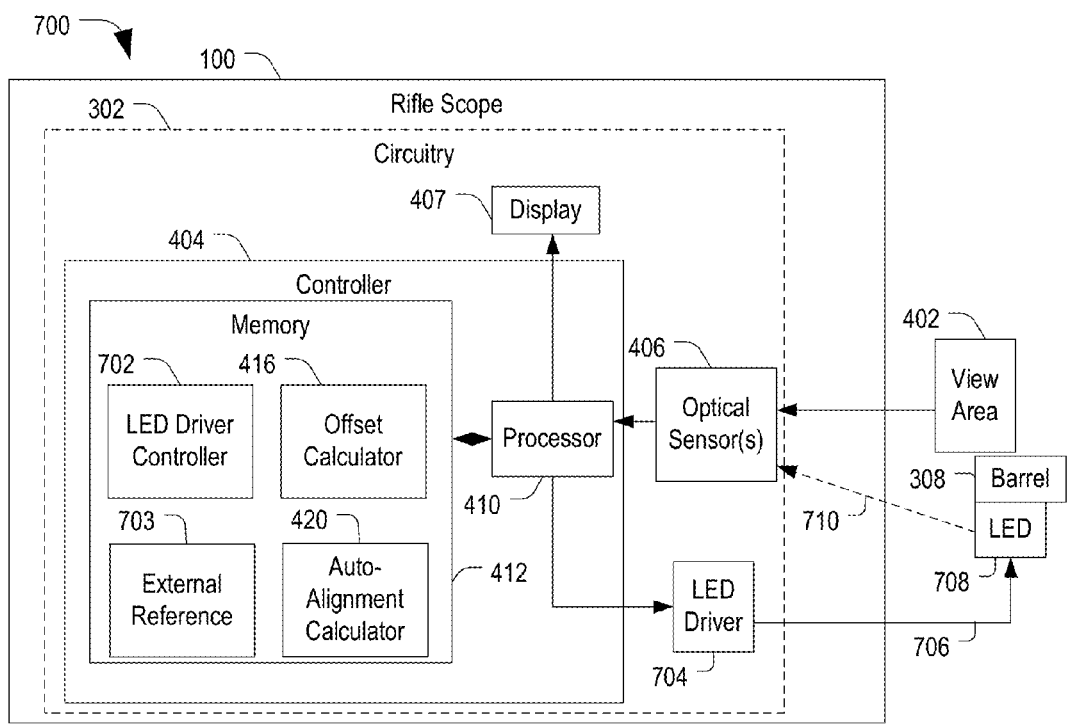
FIG. 7 is a block diagram of a second embodiment of a system including a rifle scope configured for automatic alignment to a barrel based on a beam from a light emitting diode circuit coupled to the barrel.

FIG. 7 is a block diagram of a second embodiment of a rifle scope 700 configured for automatic alignment to barrel 308 based on a beam from an LED circuit 708 coupled to barrel 308. In this example, circuitry 302 includes all of the elements of circuitry 302 in FIG. 4, except that laser source 409 and beam splitter 411 are replaced with an LED driver 704 coupled to a LED circuit 708, either through wires or through a wireless communication link. LED circuit 708 is coupled to barrel 308. Additionally, memory 412 includes LED driver controller instructions 702 instead of laser control instructions 414.

In this example, the zero adjustment may be simpler. During manufacturing, the external light source (LED circuit 708) is calibrated to the bore of barrel 308, and the position of the received beam is stored as an external reference. Subsequently, each time the gun is fired, periodically, after a shock event, by initiation of the user, or based on some other event, processor 410 executes LED driver controller instructions 702 to control LED driver 704 to produce a driver signal 706 that is provided to LED circuit 708. LED circuit 708 directs a light signal 710 toward optical sensors 406 in response to driver signal 706. Processor 410 executes offset calculator 416 to determine the angular position of barrel 308 based on a difference between the received beam ($E_n$) and the internally stored reference beam ($E_z$), which can be stored as external reference 703. The automatic zero can be determined according to the following equation:

$$A_z = E_n - E_z \qquad (2)$$

Processor 410 determines the angular position of barrel 308 relative to rifle scope 100 and uses the external reference ($E_z$) to correct shifts in the relationship between the rifle scope 100 and the bore of barrel 308 by executing auto-alignment calculator 420.

LED circuit 708 includes focusing elements to produce a collimated beam, such as one or more lenses, prisms, and/or mirrors to direct light from a light source toward rifle scope 100.

In the above-discussion, the angular position of the barrel is determined based on reflection of a laser beam or reception of directed light. In one embodiment using a laser beam, a reflective element may be attached to barrel 308 to reflect the beam. An example of a reflective element coupled to barrel 308 is described below with respect to FIG. 8.

Figure 8:
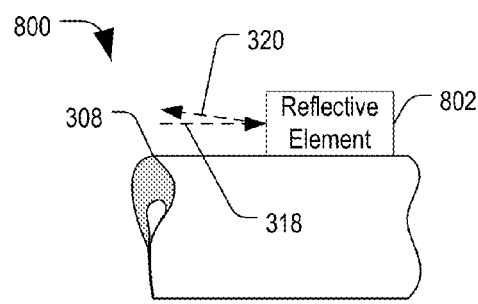
FIG. 8 is a diagram of a portion of a barrel of a firearm including a mirror element configured to reflect a light toward the rifle scope for determining the alignment.

FIG. 8 is a diagram of a portion 800 of barrel 308 of a firearm including a reflective element 802 configured to reflect first beam 318 to produce reflected beam 320 that is reflected toward the rifle scope for determining the alignment. Reflective element 802 may be coupled to barrel 308. In one example, reflective element 802 may be coupled to an iron sight of barrel 308. Reflective element 802 may be a mirror, prism, or other element that is capable of reflecting at least some of the incident energy. In some instances, reflective element 802 may be a reflective coating that is applied to a portion of barrel 308 or to appendage 322.

Reflective element 802 receives the incident energy of beam 318 at an angle of incidence and produces reflected version 320 at an angle of reflection that is twice (2×) the angle of incidence. Controller 404 determines the angular position based on the reflected version 320.

In the embodiment of FIG. 7, LED circuit 708 coupled to barrel 308 provides a collimated beam directed toward optical sensors 406. An example of the LED circuit 708 coupled to barrel 308 is described below with respect to FIG. 9.

Figure 9:
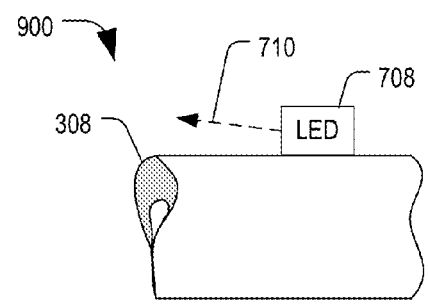
FIG. 9 is a diagram of a portion of the barrel of a firearm including a light-emitting diode circuit configured to direct a collimated beam toward the rifle scope for determining the alignment.

FIG. 9 is a diagram of a portion 900 of barrel 308 of a firearm including LED circuit 708 configured to direct collimated beam 710 toward the rifle scope for determining the alignment. In this instance, the collimated beam 710 is received and focused by objective lenses 108 to optical sensors 406 at an offset (relative to external reference 703) that can be used to determine the angular position of barrel 308.

LED circuit 708 may include mirrors, lenses, prisms, and other components configured to direct a beam toward optical sensors 406. It is also possible to detect the angular orientation of the barrel 308 using a passive element, such as a florescent coating. An example of a system that includes a florescent element is described below with respect to FIG. 10.

Figure 10:
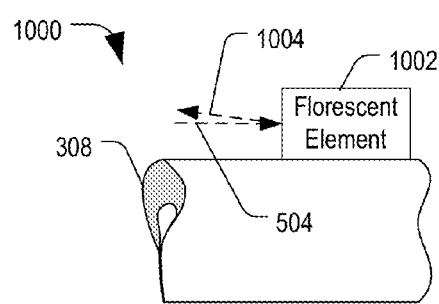
FIG. 10 is a diagram of a portion of the barrel of a firearm including a florescent element configured to emit light for determining the alignment.

FIG. 10 is a diagram of a portion 1000 of the barrel 308 of a firearm including a florescent element 1002 configured to emit light for determining the alignment. In an example, one or more optical sensors 406 may capture light 1004 emitted by florescent element 1002 and determine the angular position of barrel 318 in response to receiving light 1004. In some instances, a light source (such as laser source 409 may transmit beam 504 toward florescent element 1002 to energize or excite the florescent coating, and optical sensors 406 may capture light 1004 from the florescent coating and determine the angular position of barrel 318 based on a centroid of the captured light 1004.

In an alternative example, the florescent element 1002 may be replaced with another passive component, which is not controlled by rifle scope 100. In another alternative embodiment, florescent element may be replaced by a radioactive element, such as a Tritium-based component, configured to emit detectable amounts of radiation, which can be detected by sensors within telescopic device 100. The radiation may be electrons, light, or any combination thereof, which can be used by circuitry within telescopic device 100 to determine the alignment.

While the above-examples have used emitted or reflected light to determine the angular position of 318, it is also possible to determine the angular position based on image processing. One possible embodiment of rifle scope 100 configured to automatically determine the angular position of barrel 308 using image processing is described below with respect to FIG. 11.

Figure 11:
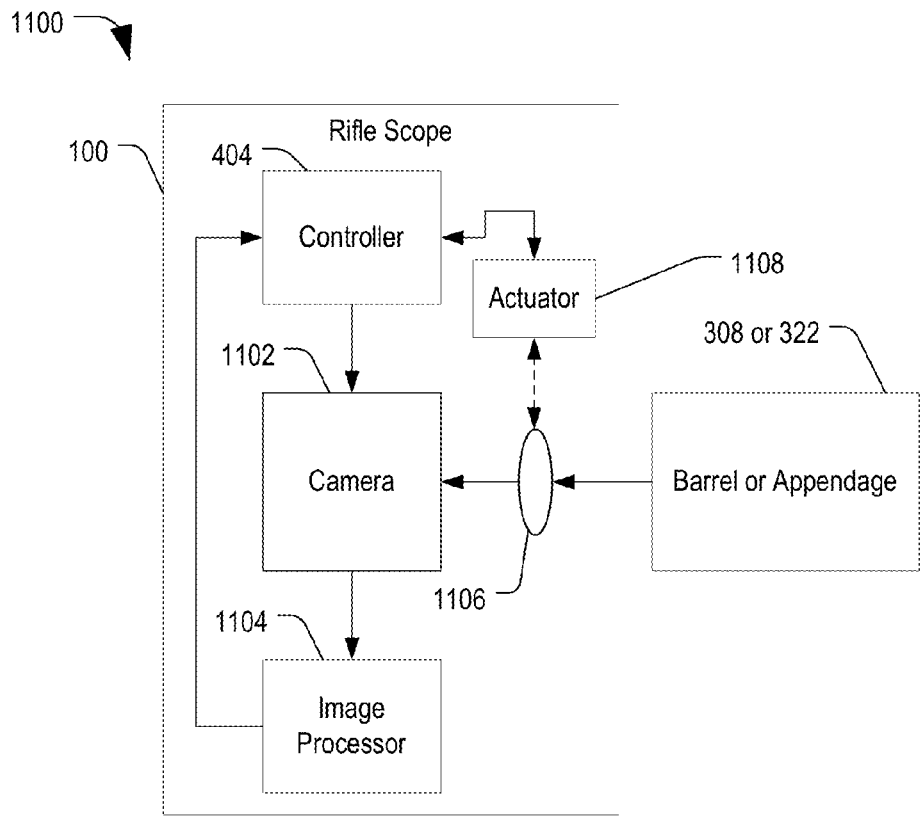
FIG. 11 is a block diagram of a third embodiment of a system including a rifle scope configured to use image processing to determine the alignment.

FIG. 11 is a block diagram of a third embodiment of a system 1100 including rifle scope 100 configured to use image processing to determine the alignment. Rifle scope 100 includes controller 404 coupled to a camera 1102 and to an image processor 1104. Rifle scope 100 further includes a lens 1106 that can be positioned by an actuator 1108 that is coupled to controller 404 to selectively position the lens 1106 between camera 1102 and barrel 308 to focus the camera 1102 toward the barrel 308 or appendage 322. Actuator 1108 makes it possible to use the same optical sensors for alignment and for capturing images of the view area by selectively switching lens 1106 into and out of the optical path. In a particular example, camera 1102 may represent optical sensors 406.

In some embodiments, controller 404 may include image processing instructions that allow processor 410 to process captured images to determine the alignment. Camera 1102 captures images of barrel 308 or appendage 322 when actuator 1108 moves lens 1106 into its optical path and provides the images to image processor 1104, which processes the images to determine the angular position of barrel 308 relative to rifle scope 100. Controller 404 uses the angular position to automatically align rifle scope 100 to the angular position of barrel 308. Once aligned, controller 404 controls actuator 1108 to move lens 1106 out of the optical path, and camera 1102 can capture images of the view area and present them to the user on a display. In other embodiments, lens 1106 may be permanently installed into a beam path of system 1100 to provide imaging of the barrel or appendage while simultaneously allowing the optical sensor 1102 to capture imagery of the view area. One or more actuators may also be used to move (either via macro or micro movements) one or more lenses in the optical system to adjust boresight and provide offset correction.

Figure 12:
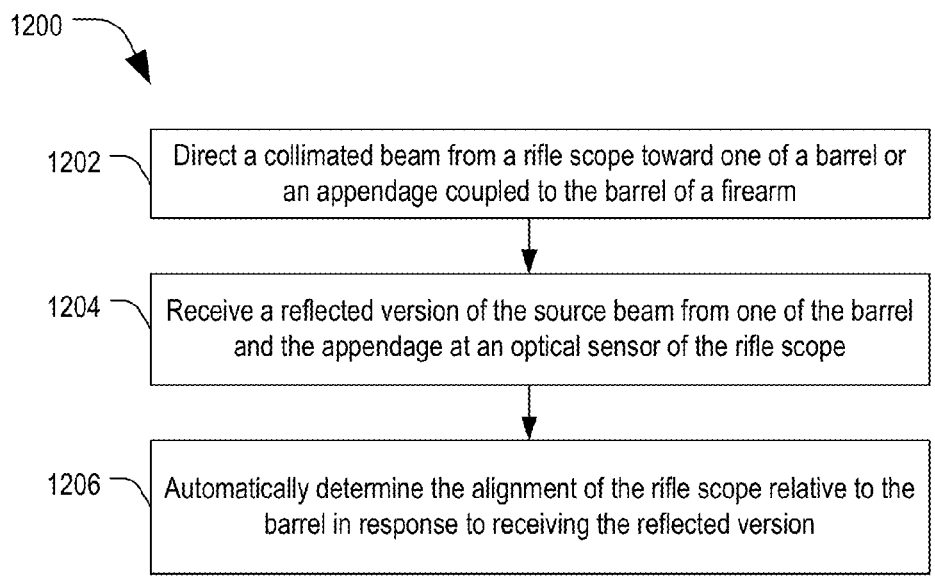
FIG. 12 is a flow diagram of an embodiment of a method of automatically determining the alignment using a collimated beam.

FIG. 12 is a flow diagram of an embodiment of a method 1200 of automatically determining the alignment using a collimated beam. At 1202, a collimated beam 318 is directed from a rifle scope 100 toward one of a barrel 308 or an appendage 322 coupled to the barrel 308 of a firearm. The appendage may be an iron sight, a reflective element mounted to the barrel or the iron sight, or some other structure.

Advancing to 1204, a reflected version 320 of the source beam 318 is received at an optical sensor 406 of the rifle scope 100 from one of the barrel 308 and the appendage 322. The reflected version may be received directly by the optical sensor or may be redirected to the optical sensor using a beam splitter 411, mirrors, or some other mechanism. The reflected version 320 may be offset from the source beam 318 by an angle 520 that corresponds to two times the angle of incidence of the reflective element 802.

Continuing to 1206, the controller automatically determines the alignment of the rifle scope 100 relative to the barrel 308 in response to receiving the reflected beam. In an example, an offset between the reflected beam and a reference beam may be used to determine the angular position of barrel 308.

In the above-examples, the controller 404 controls a laser beam or optical source to direct light toward the barrel 308 or toward an appendage 322 of the barrel, receives reflected light, and compares a position of the reflected light to an external reference to determine the angular position of barrel 308 relative to rifle scope 100. Further, a beam splitter directs a portion of the laser beam toward the optical sensors 406 to provide an internal reference beam. Controller 404 can compare a position of the internal reference beam to that of an internal reference to detect internal shifts. It is also possible to determine the angular position of barrel 308 relative to rifle scope 100 by capturing emitted radiation associated with a radioactive element and/or emitted light associated with a florescent element or an LED circuit coupled to barrel 308. An example of a method of automatically determining the alignment of rifle scope 100 relative to barrel 308 is described below with respect to FIG. 13.

Figure 13:
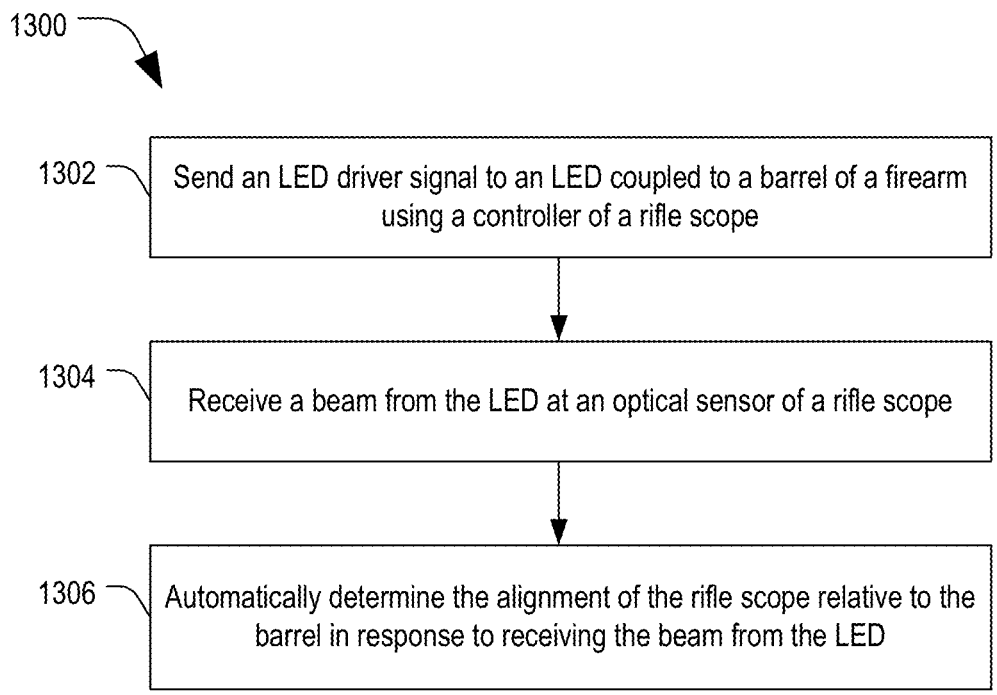
FIG. 13 is a flow diagram of an embodiment of a method of automatically determining the alignment using a light-emitting diode coupled to the barrel.

FIG. 13 is a flow diagram of an embodiment of a method 1300 of automatically determining the alignment using an LED circuit 708 coupled to barrel 308. At 1302, controller 404 of rifle scope 100 sends an LED driver signal 706 to an LED circuit 708 coupled to barrel 308 of a firearm. LED driver signal 706 may be sent via a wired connection. Alternatively, LED driver signal 706 may be transmitted wirelessly.

Advancing to 1304, an optical sensor 406 of rifle scope 100 receives a beam 710 from the LED circuit 708. Beam 710 may be focused, collimated, controlled, or modified by one or more lenses, mirrors, or other optical elements. Continuing to 1306, controller 404 automatically determines the alignment of rifle scope 100 relative to barrel 308 in response to receiving beam 710 from the LED circuit 708. In an example, controller 404 determines an offset between the position of the beam 710 relative to an external reference.

While the embodiment of FIG. 13 uses a collimated beam from the LED circuit 708, it is also possible to utilize a florescent coating or element to passively emit light that may be used to determine the angular position of barrel 308. Alternatively, it is also possible to determine the angular position of barrel 308 relative to rifle scope 100 by capturing image data associated with barrel 308 and processing the image data to determine the angular position relative to rifle scope 100. An example of a method of automatically determining the alignment of rifle scope 100 relative to barrel 308 using image processing is described below with respect to FIG. 14.

Figure 14:
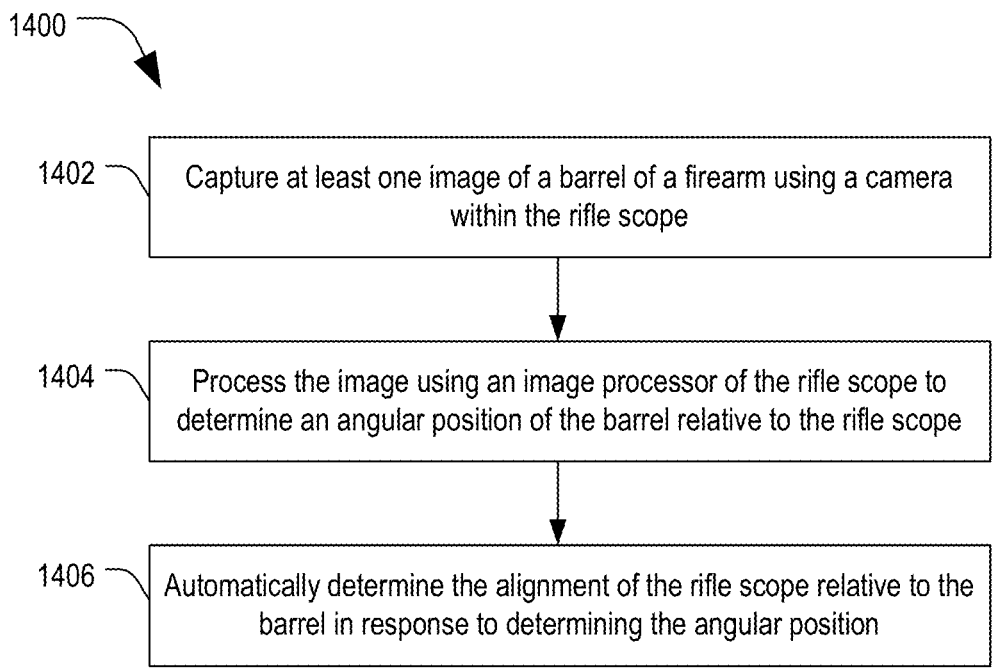
FIG. 14 is a flow diagram of an embodiment of a method of automatically determining the alignment using image processing.

FIG. 14 is a flow diagram of an embodiment of a method 1400 of automatically determining the alignment using image processing. At 1402, a camera 1102 of rifle scope 100 captures at least one image of barrel 308 of a firearm. In an example, controller 404 controls actuator 1108 to position a lens 1106 in the optical path to refocus the camera 1102 onto barrel 308 or appendage 322. The actuator may also be a shutter or other separate beam path. Advancing to 1404, image processor 1104 of rifle scope 100 processes the image to determine the angular position of the barrel 308 relative to rifle scope 100. Advancing to 1406, controller 404 automatically determines the alignment of rifle scope 100 relative to barrel 308 in response to determining the angular position.

In some embodiments, image processor 1104 may be separate from controller 404. In other embodiments, controller 404 may include an image processor and associated instructions that, when executed, cause the image processor to determine the angular position of the barrel from the image data relative to the optical sensors that captured the image data. In a particular example, the controller 404 processes the image data as if the internal components of the rifle scope 100 do not change over time, and presuming that any offset is due to mechanical movement and the physical orientation of the rifle scope 100 relative to the firearm. At relatively high levels of precision, any internal variations due to heating, etc., would be automatically accounted for by controller 404.

In conjunction with the rifle scopes and methods described above with respect to FIGS. 1-14, a rifle scope includes at least one sensor configured to capture optical data associated with at least one barrel and an appendage coupled to the barrel of a firearm. The rifle scope further includes a controller coupled to the sensor and configured to determine the alignment of the rifle scope relative to the barrel based on the optical data. The optical data may include a reflected version of a laser beam, emitted light from an LED circuit, captured light emitted by a florescent coating or element, or image data. Once the alignment is determined, the alignment may be used to adjust the view area or the reticle and/or to determine the ballistic solution relative to a target.

Although the present invention has been described with reference to preferred embodiments, workers skilled in the art will recognize that changes may be made in form and detail without departing from the scope of the invention.

What is claimed is:

1. A rifle scope for use with a firearm including a barrel, the rifle scope comprising:
    at least one optical sensor configured to capture optical data including an image of at least one of the barrel of the firearm and an appendage coupled to an external surface of the barrel; and
    a controller coupled to the at least one optical sensor and configured to determine an angular position of the barrel in response to capturing the optical data, the controller configured to automatically determine an alignment of the rifle scope relative to the barrel in response to determining the angular position.

2. The rifle scope of claim 1, wherein the appendage coupled to the barrel comprises a reflective element.

3. The rifle scope of claim 1, further comprising:
    a light source configured to provide a collimated beam;
    a beam splitter configured to split the collimated beam into a first beam directed toward the at least one of the barrel and the appendage and a second beam directed toward the at least one optical sensor, the beam splitter further configured to receive a reflected version of the first beam and to direct the reflected version toward the optical sensor to capture the optical data; and wherein the controller is configured to determine the angular position of the barrel relative to the rifle scope based on an internal offset between the second beam and an internal reference and based on an external offset between the reflected version and an external reference to determine the angular position in response to determining the offset.

4. The rifle scope of claim 1, further comprising:
a florescent coating on the at least one of the barrel and the appendage; and
wherein the at least one optical sensor captures the optical data corresponding to light emitted by the florescent coating.

5. The rifle scope of claim 1, wherein:
the appendage comprises an emitter configured to emit radiation toward the at least one optical sensor; and
the at least one optical sensor captures the optical data corresponding to the radiation emitted by the emitter.

6. The rifle scope of claim 1, wherein the appendage comprises a light emitting circuit coupled to the barrel and configured to direct a light beam toward the at least one optical sensor.

7. The rifle scope of claim 6, wherein the controller is communicatively coupled to the light emitting circuit and configured to selectively activate the light emitting circuit to produce the light beam.

8. The rifle scope of claim 1, wherein:
at least one optical sensor comprises a camera;
the optical data comprises images representing optical data corresponding to at least a portion of the barrel; and
the controller processes the images to determine the angular position of the barrel relative to the rifle scope.

9. The rifle scope of claim 1, wherein the controller determines the angular position periodically.

10. A method comprising:
automatically capturing optical data corresponding to at least one of a barrel of a firearm and an appendage coupled to the barrel using a rifle scope coupled to the firearm;
automatically determining an angular position of the barrel relative to the rifle scope in response to capturing the optical data; and
automatically determining an alignment of the rifle scope relative to the barrel in response to determining the angular position.

11. The method of claim 10, wherein automatically capturing the optical data comprises:
capturing one or more images of at least one of the barrel and the appendage; and
processing the one or more images using an image processor of the rifle scope to determine the angular position.

12. The method of claim 10, wherein automatically capturing the optical data comprises:
directing a first beam toward the at least one of the barrel and the appendage;
receiving a reference beam at an optical sensor;
receiving a reflected version of the first beam at the optical sensor; and wherein the optical data includes the reference beam and the reflected version.

13. The method of claim 12, wherein directing the beam comprises splitting a laser beam into the first beam and the reference beam using a beam splitter of the rifle scope.

14. The method of claim 12, wherein automatically determining the alignment comprises determining an internal offset between the reference beam and an internal reference and an external offset between the reflected version and an external reference using a controller of the rifle scope.

15. The method of claim 10, wherein the appendage comprises at least one of a reflective element coupled to the barrel or a florescent coating applied to a portion of the barrel.

16. The method of claim 10, wherein, before automatically capturing the optical data, the method further comprises:
controlling a light emitting diode coupled to the barrel to emit a beam of light toward the rifle scope; and
wherein the optical data comprises data related to the beam of light.

17. The method of claim 10, wherein:
the appendage comprises an emitter configured to emit radiation; and
automatically capturing the optical data comprises detecting radiation emitted by the emitter.

18. An apparatus comprising:
a viewing device configured to couple to a firearm including a barrel, the viewing device including:
at least one optical sensor configured to capture optical data associated with the barrel of the firearm; and
a controller coupled to the at least one optical sensor and configured to determine an angular position of the barrel relative to the viewing device in response to capturing the optical data to automatically align the viewing device to the barrel.

19. The apparatus of claim 18, wherein the controller includes a processor configured to process the optical data to determine the angular position.

20. The apparatus of claim 18, further comprising:
a laser source responsive to the controller and configured to produce a beam of light; and
a beam splitter configured to split the beam into a first beam directed toward at least one of the barrel and an appendage coupled to the barrel and a second beam directed toward the at least one optical sensor, the beam splitter further configured to direct a reflected version of the first beam toward the at least one optical sensor; and
wherein the controller determines the angular position of the barrel based on an internal offset between the second beam and an internal reference and based on an external offset between the reflected version and an external reference.

21. The apparatus of claim 18, further comprising a driver circuit configured to selectively activate a light-emitting diode circuit oriented toward the at least one sensor; and
wherein the optical data includes light captured from the light-emitting diode circuit.

22. The apparatus of claim 18, further comprising:
a passive emitter coupled to at least a portion of the barrel; and
wherein the optical data includes radiation from the passive emitter.

* * * * *